United States Patent
Shang

(10) Patent No.: US 7,051,156 B2
(45) Date of Patent: *May 23, 2006

(54) RAID-5 DISK HAVING CACHE MEMORY

(75) Inventor: Rung-Ji Shang, Taipei (TW)

(73) Assignee: Synology Inc., Taipei (TW)

( * ) Notice: Subject to any disclaimer, the term of this patent is extended or adjusted under 35 U.S.C. 154(b) by 314 days.

This patent is subject to a terminal disclaimer.

(21) Appl. No.: 10/688,359

(22) Filed: Oct. 17, 2003

(65) Prior Publication Data

US 2004/0088485 A1     May 6, 2004

Related U.S. Application Data

(60) Provisional application No. 60/424,190, filed on Nov. 6, 2002.

(51) Int. Cl.
    *G06F 12/00*     (2006.01)

(52) U.S. Cl. .................. 711/114; 711/113; 711/209; 714/6

(58) Field of Classification Search ............... None
See application file for complete search history.

(56) References Cited

U.S. PATENT DOCUMENTS

| | | | |
|---|---|---|---|
| 4,744,980 A | 5/1988 | Holly | |
| 4,818,537 A | 4/1989 | Guo | |
| 4,914,088 A | 4/1990 | Glonek et al. | |
| 5,371,108 A | 12/1994 | Korb et al. | |
| 6,243,795 B1 * | 6/2001 | Yang et al. ................ | 711/159 |
| 6,467,022 B1 * | 10/2002 | Buckland et al. ........... | 711/113 |
| 6,629,211 B1 * | 9/2003 | McKnight et al. .......... | 711/141 |
| 6,760,807 B1 * | 7/2004 | Brant et al. ................. | 711/114 |
| 6,941,420 B1 * | 9/2005 | Butterworth et al. ....... | 711/114 |

FOREIGN PATENT DOCUMENTS

| | | |
|---|---|---|
| EP | 0 448 762 A1 | 10/1991 |
| EP | 1 020 194 A1 | 7/2000 |
| WO | WO 83/00091 | 1/1983 |

\* cited by examiner

*Primary Examiner*—Gary Portka
*Assistant Examiner*—Jasmine Song
(74) *Attorney, Agent, or Firm*—Perkins Coie LLP

(57) ABSTRACT

A computer implemented cache memory for a RAID-5 configured disk storage system to achieve a significant enhancement of the data access and write speed of the raid disk. A memory cache is provided between the RAID-5 controller and the RAID-5 disks to speed up RAID-5 system volume accesses. It utilizes the time and spatial locality property of parity blocks. The memory cache is central in its physical architecture for easy management, better utilization, and easy application to a generalized computer system. The cache blocks are indexed by their physical disk identifier to improve the cache hit ratio and cache utilization.

5 Claims, 6 Drawing Sheets

RAID-5 DISK HAVING CACHE MEMORY

PRIORITY CLAIM

This application claims priority under 35 U.S.C. §119 to U.S. Provisional Patent Application Ser. No. 60/424,190 filed Nov. 6, 2002, which is hereby incorporated by reference in its entirety.

TECHNICAL FIELD

The present invention relates to the operation of computer data storage, and more particularly, to a RAID-5 disk having cache memory and the operating method thereof

BACKGROUND

The installation and use of cache memory in a computer system is common, since the use of cache memory can enhance computer program execution speed significantly. Further, the use of so-called "redundant array of inexpensive disks" (RAID) is commonly used to store critical data. As the price of RAID storage decreases, its applications increase and it is envisioned that RAID storage may be available to consumers for personal use.

Disk storage devices are mechanical in nature. This can be problematical insofar as a computer system accessing the disk storage faces a bottleneck. Disk input/output is generally slower than microprocessor operations and memory access. In general, a RAID system organizes a plurality of disks to create a virtual disk volume. Further, there is usually a RAID controller that accepts the input/output requests and dispatches it to the disks.

There are several RAID architectures that organize the disks in different manners to provide different advantages. For example, a "RAID-0" system distributes data blocks throughout the disks to expand the storage volume, to balance the loading of each disk, and to enhance throughput. A "RAID-1" system provides a duplicate set of mirrored disks and stores each data block to the paired disk. Such an architecture solves the reliability problem and keeps data even after any one disk failure. The disadvantage of such a system is that it doubles the disk cost.

In yet another RAID system, known as the "RAID-5" system, the data is interleaved blockwise over all of the disks and parity blocks are added and distributed over all the disks. This provides reliability similar to a RAID-1 system and can recover data when a single disk fails by reading the parity block in other data blocks on the same stripe. On the other hand, the RAID-5 architecture provides a larger space than a RAID-1 system because it only uses one disk for the redundant data. Raid-5 systems also balance the loading of the disks by distributing parity blocks over all of the disks. One drawback of the RAID-5 system is that it generates in general more disk input/outputs for each write operation. A write operation to a block of a RAID-5 volume will be dispatched as two read operations and two write operations.

DETAILED DESCRIPTION

The present invention provides a computer implemented cache memory for a RAID-5 configured disk storage system to achieve a significant enhancement of the data access and write speed of the raid disk. The present invention adopts a memory cache between the RAID-5 controller and the RAID-5 disks to speed up RAID-5 system volume accesses. It utilizes the time and spatial locality property of parity blocks. The memory cache is central in its physical architecture for easy management, better utilization, and easy application to a generalized computer system. The cache blocks are indexed by their physical disk identifier to improve the cache hit ratio and cache utilization.

In addition, the present invention includes a flush daemon program for flushing dirty blocks existing in a cache memory back to the disk, a write procedure to copy data to the cache, or to allocate data block space in the cache, and to wake up the flush daemon when needed. Further, a read procedure is provided to read block data already existing in the cache memory or to allocate data block space in cache memory and then to set the data block to the cache space and read data from the disk to the cache.

Figure 1:
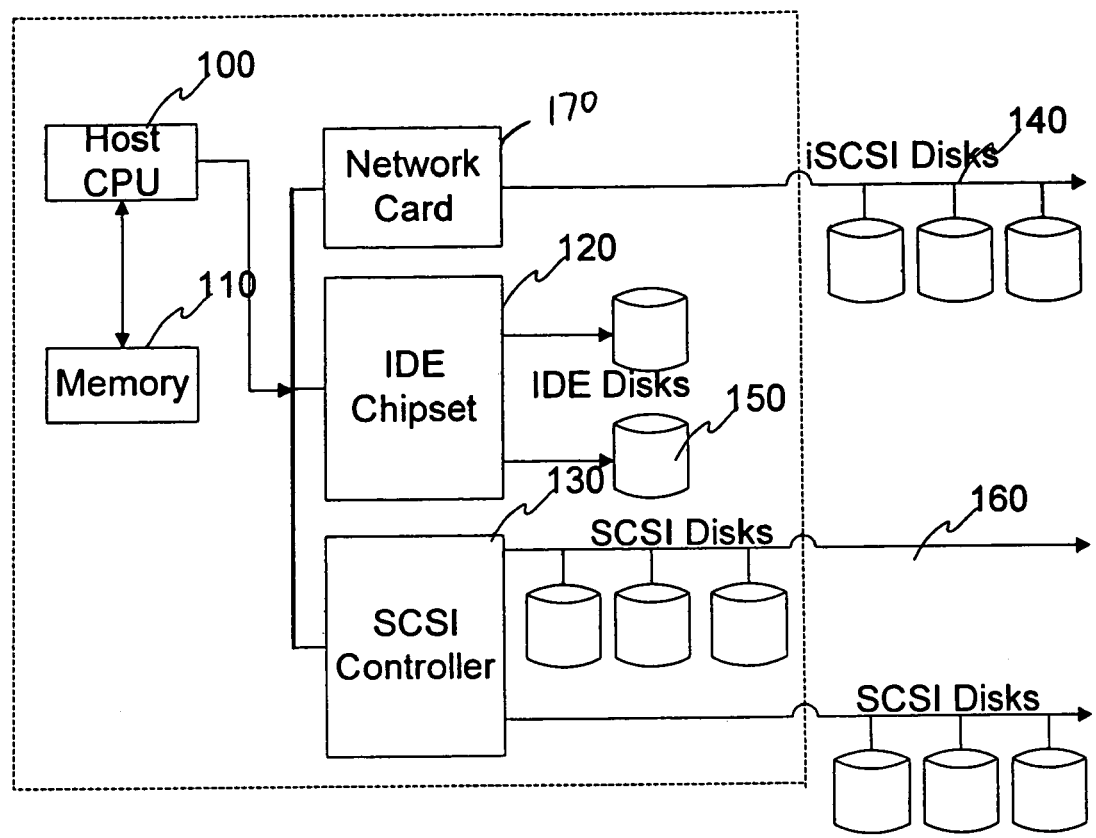
FIG. 1 shows in schematic form a RAID storage with a RAID controller formed in accordance with the present invention.

FIG. 1 shows an example of a computer system hardware structure that may be used to implement the present invention. The computer system consists of a host CPU 100, a memory module 110, and a plurality of disks. The disks in the computer system can be a SCSI ("scuzzy") disk 160 connected via an SCSI controller 130. Alternatively, IDE disks 150 may be connected via an IDE controller 120. Still alternatively, iSCSI disks 140 may be connected via network cards 170. The disks are configured as one or more RAID 5 disk volumes. The present invention can be applied to either a general purpose computer system in which the RAID-5 control and cache control of the present invention are software programs running on the host CPU 100. Alternatively, the present invention may be implemented as a storage subsystem that serves other computers and the host CPU 100 is dedicated to the RAID control and cache control functions of the present invention.

Figure 2:
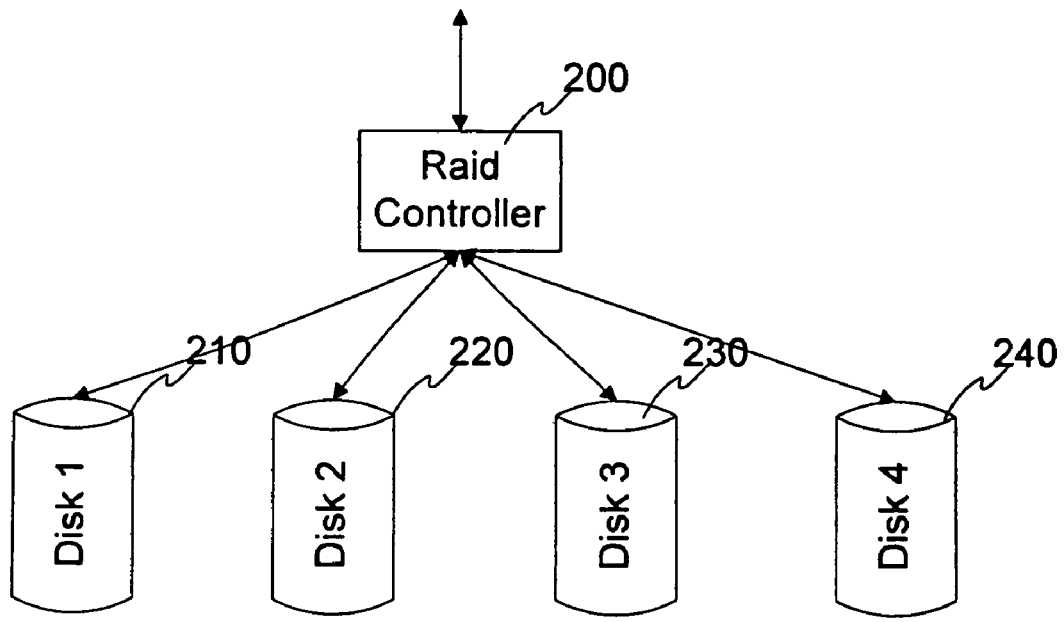
FIG. 2 shows in schematic form a conventional RAID storage system.

FIG. 2 shows a block diagram of a traditional RAID system. The RAID controller 200 is either a hardwired controller or a CPU controller that processes the input/output request to the disk array. In a RAID system, a plurality of physical disks 210, 220, 230, and 240 are configured to be a virtual disk volume. The RAID controller 200 will process the input/output request to the virtual volume and dispatch them to the physical disks 210–240. In general, the RAID system can provide higher reliability by redundant disks or better throughput by parallelizing the disk access channel. The real advantage of a RAID system depends on the RAID type.

The present invention is applied to a RAID-5 system in which the RAID-5 system uses one disk block of the physical disks as the parity block. It is the parity of the data blocks on the other disks. In a RAID-5 system, any stored data can be recovered in the case of a single disk failure by reading the parity block and the other data blocks.

Figure 3:
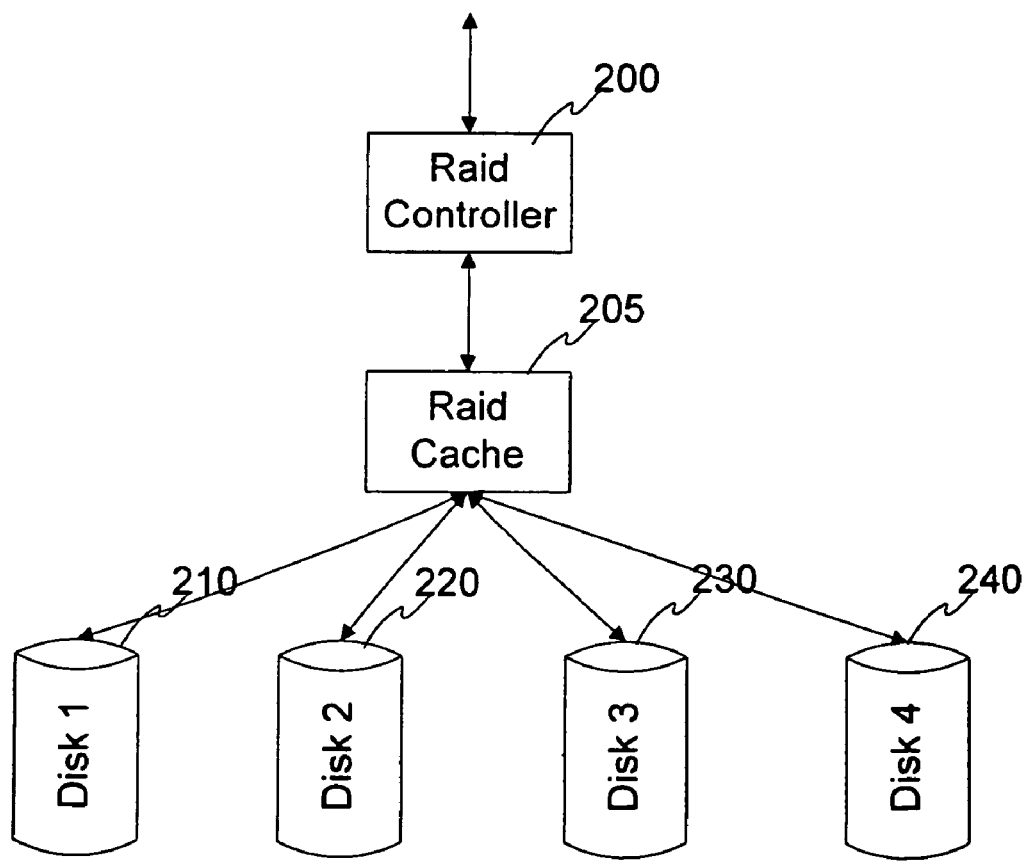
FIG. 3 shows in schematic form a RAID disk erase system formed in accordance with the present invention.

FIG. 3 shows in block diagram form a RAID-5 system formed in accordance with the present invention. A RAID cache 205 is added between the RAID controller 200 and the disks 210–240. In the implementation shown in FIG. 1, the RAID cache 205 is equivalent to the memory module 110 of FIG. 1. As noted previously, disk input/output is generally slower than CPU operations and memory accesses. The cache memory 205 is placed between the access path of the CPU and the physical disks to speed up disk access.

The RAID cache 205 is a global memory that serves all of the disks 210–240. A global memory cache is advantageous for several reasons. First, in a general computer architecture, it is easier to access a global memory cache and the cache hit transmission time is smaller because the memory bus is much faster than a disk bus. Therefore, the general computer can access the RAID cache 205 much faster than if the cache memory were distributed to the individual disks 210-240. Second, it is easier to apply battery backup memory or nonvolatile memory to the global memory cache 205 in order to maintain data consistency after a system crash. In other words, by having a single RAID cache 205, this is more reliable in general than having distributed cache memories in each of the disks 210–240. Third, the cache hit ratio and data utilization is higher in a bigger global memory cache than several small scale memory caches.

Figure 4:
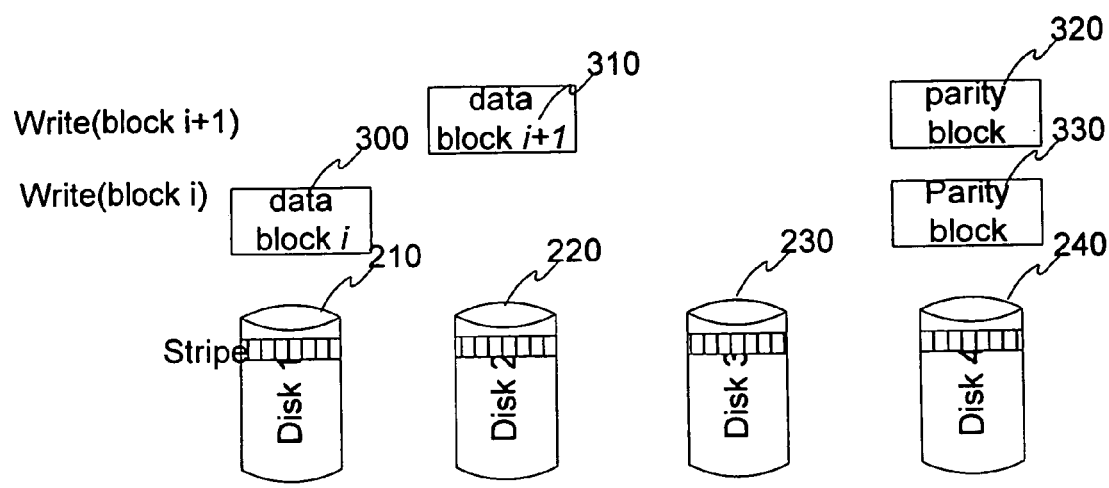
FIG. 4 shows a sequence of disk accesses that relocate to the same disk block in accordance with the present invention.

FIG. 4 shows an example of a sequence of RAID-5 disk write operations that can improve RAID-5 performance in accordance with the present invention. It is also explained below why the RAID cache 205 is needed in addition to the buffer cache that is commonly used to delay disk write operations in most operating systems. In a RAID-5 system, the data is interleaved blockwise over all of the disks and parity blocks are added and distributed over all the disks recover data when a single disk fails.

In general, a write operation to a block of a RAID-5 volume will result in the dispatch of two read operations and two write operations. The RAID controller will read the data block from a disk and read the parity block from another disk. The RAID controller will then compute the new parity block by "exclusive or" ("XOR") operations on the new data block, the old data block and the old parity block. Finally, it writes back both the data block and the parity block to the disks. The four disk operations for a disk write is one performance bottleneck in a RAID-5 system.

For example, in FIG. 4, four disks 210–240 are configured as a RAID-5 volume. Two contiguous write operations write data to contiguous block i 300 and block i+1 310 of the RAID-5 volume. A normal buffer cache does not have any benefit in this general case because they are different blocks and the data in the buffer cache cannot be reused. This would require eight disk input/outputs to complete these two write operations.

With a RAID cache 205, the RAID controller 200 will dispatch a write operation to the data block and the parity block on the specific physical disks first and then look up the blocks in the RAID cache 205. The blocks in the cache memory 205 are indexed and managed by their physical disk identifier and physical block identifier. In this case, because the parity blocks 320 and 330 are the same block for contiguous data, the parity block is cached in memory after the first read. It only requires six disk input/outputs for these two operations. In general, for a RAID-5 system with N+1 disks, the number of disk input/outputs for a contiguous write will reduce to 2N+2 compared to 4N with the prior art.

In the present invention, a write-back cache policy is used for the write operation. For a write operation, data is only written to the RAID cache 205. The RAID controller 200 then updates data from the RAID cache 205 to the disks 210–240 only when necessary. To manage cache blocks in the cache memory 205 there are two flag bits for cache block. A "dirty bit" is used to indicate if a block has been modified, and it is set when data is written to the cache block and cleared when the cache block has been written to one of the disks 210–240. A "cached bit" is used to indicate if there is valid data in the RAID cache 205, and it is set when data is loaded from the disks 210–240 to the RAID cache 205 and cleared if an error occurs.

Figure 5:
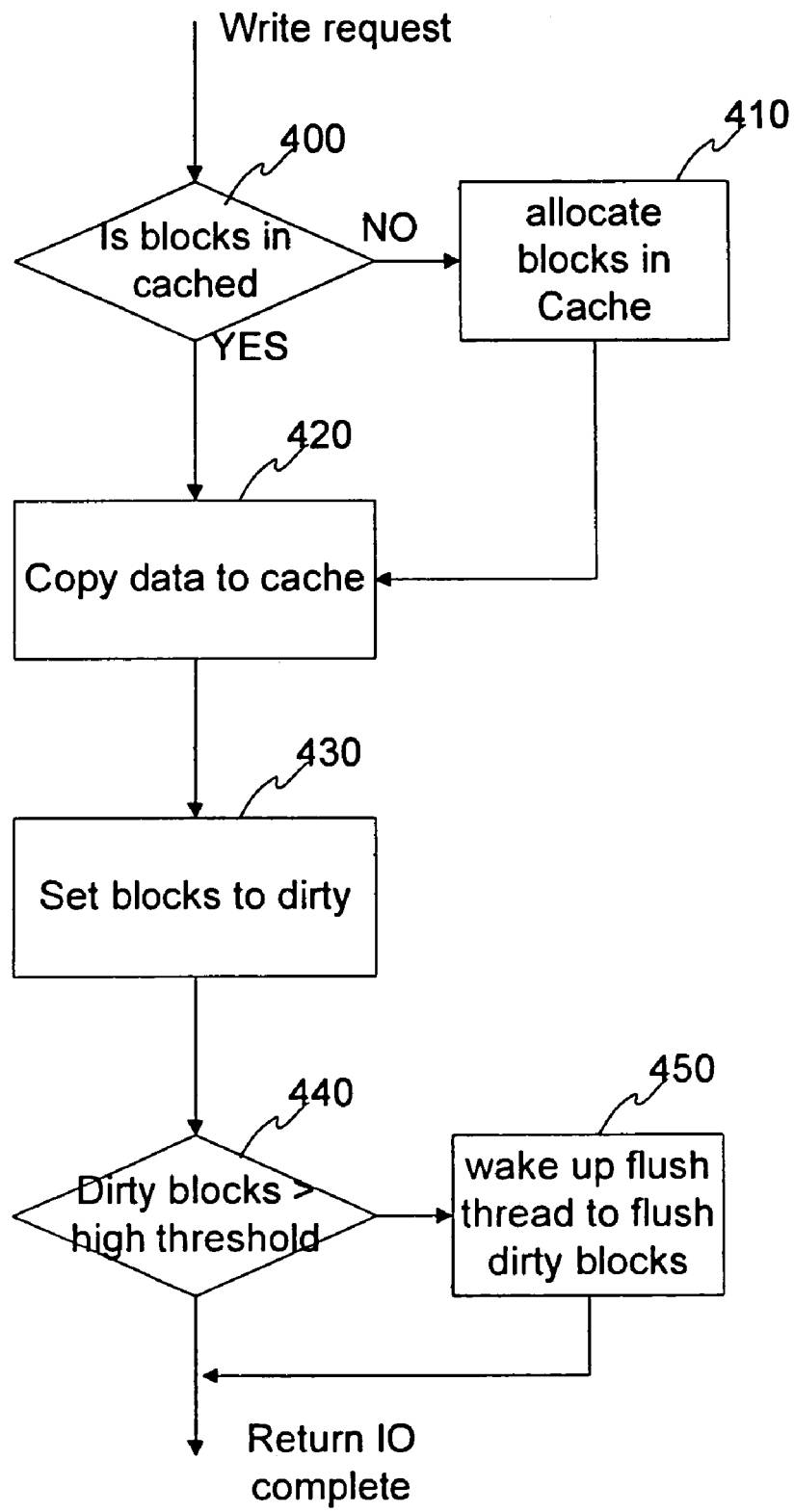
FIG. 5 shows a flow diagram illustrating a disk write request.

FIG. 5 shows a flow diagram of the operation of writing a block to a physical disk. The RAID controller 200 accepts input/output requests to the RAID-5 volume and dispatches it to read/write requests to the data block and parity block of the physical disks. The flow diagram applies to both data blocks and parity blocks.

First, at step 400, the data from the write request is analyzed to determine if the data block has already been stored in the RAID cache 205. If it is not stored in the RAID cache 205 already, then the RAID controller 200 allocates blocks within the RAID cache 205 for storing the data at step 410. In general, the controller will allocate those cache blocks that are not "dirty" and have been least used to the data blocks. However, if the write request contains data in the RAID cache 205, then at step 420, the data is copied into the RAID cache 205. Then, at step 430, the dirty bit flag is set to dirty for that block.

The RAID controller 200 can reply to the computer or microprocessor that the write request is complete immediately and does not have to wait until the data has been written to the disks 210–240. Finally, the RAID controller 200 will check the number of dirty blocks in the RAID cache 205 at a step 440. If it is larger than a threshold, the RAID controller 200 will initiate a flushing step 450 to write the dirty blocks from the RAID cache 205 to the disks 210–240.

Figure 6:
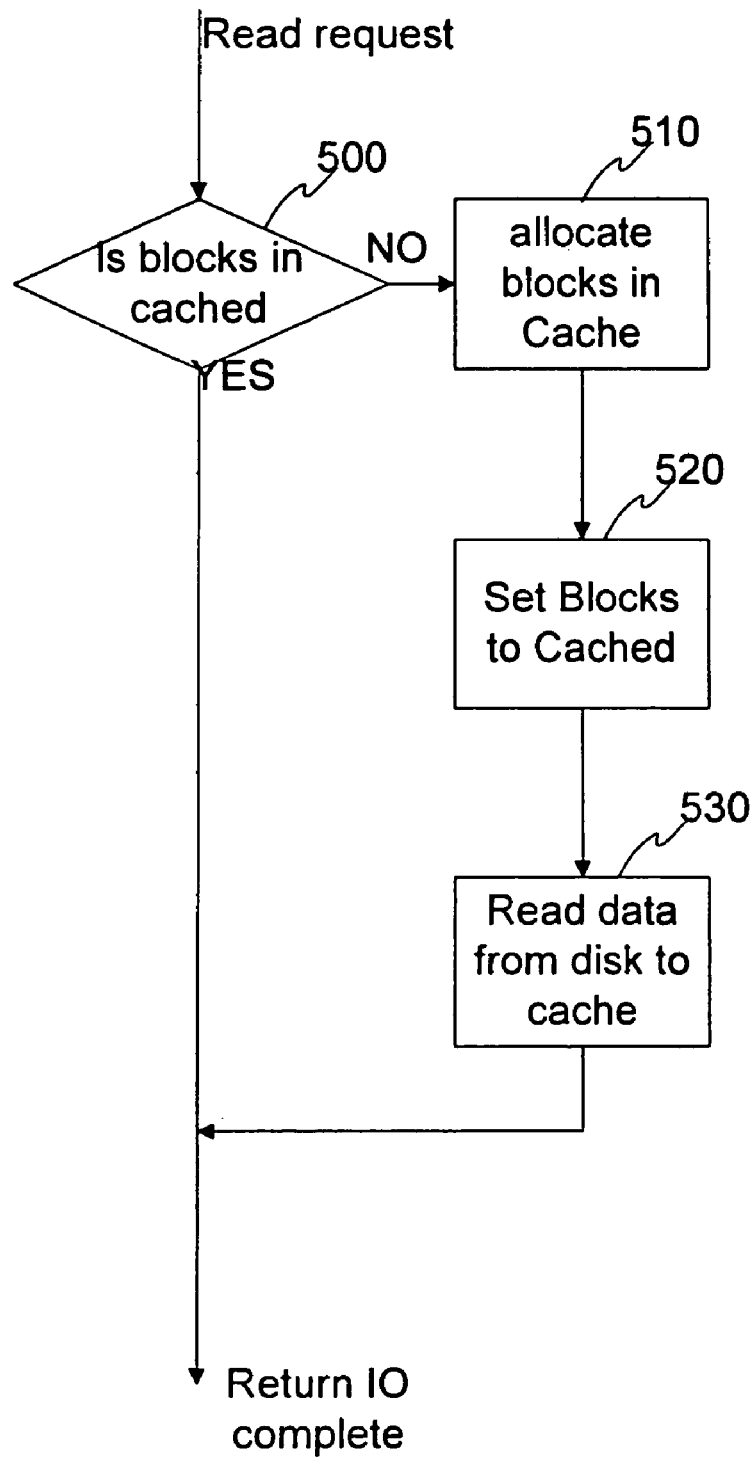
FIG. 6 shows a flow diagram of a disk read request.

FIG. 6 shows a flow diagram of the operation of reading data of a block from a physical disk. First, at step 500, it determines whether the reading block is already stored in the RAID cache 205. If it is not stored in the cache memory, the RAID controller 200 will allocate a not dirty and least used block to the reading block at step 510. The RAID controller 200 sets a flag of the block to "cached" at step 520 and then copies data from the physical disks 210–240 to the allocated cache block at step 530. Finally, it returns data from the RAID cache 205 and the read request is completed.

In the present invention, the RAID controller 200 does not write data to the disks and wait for a write complete on the write request. Instead, a flush thread takes the responsibility for writing dirty blocks to the disks 210–240. It will write dirty blocks to the disks 210–240 when the number of dirty blocks or the space of dirty blocks is over a predetermined threshold.

Figure 7:
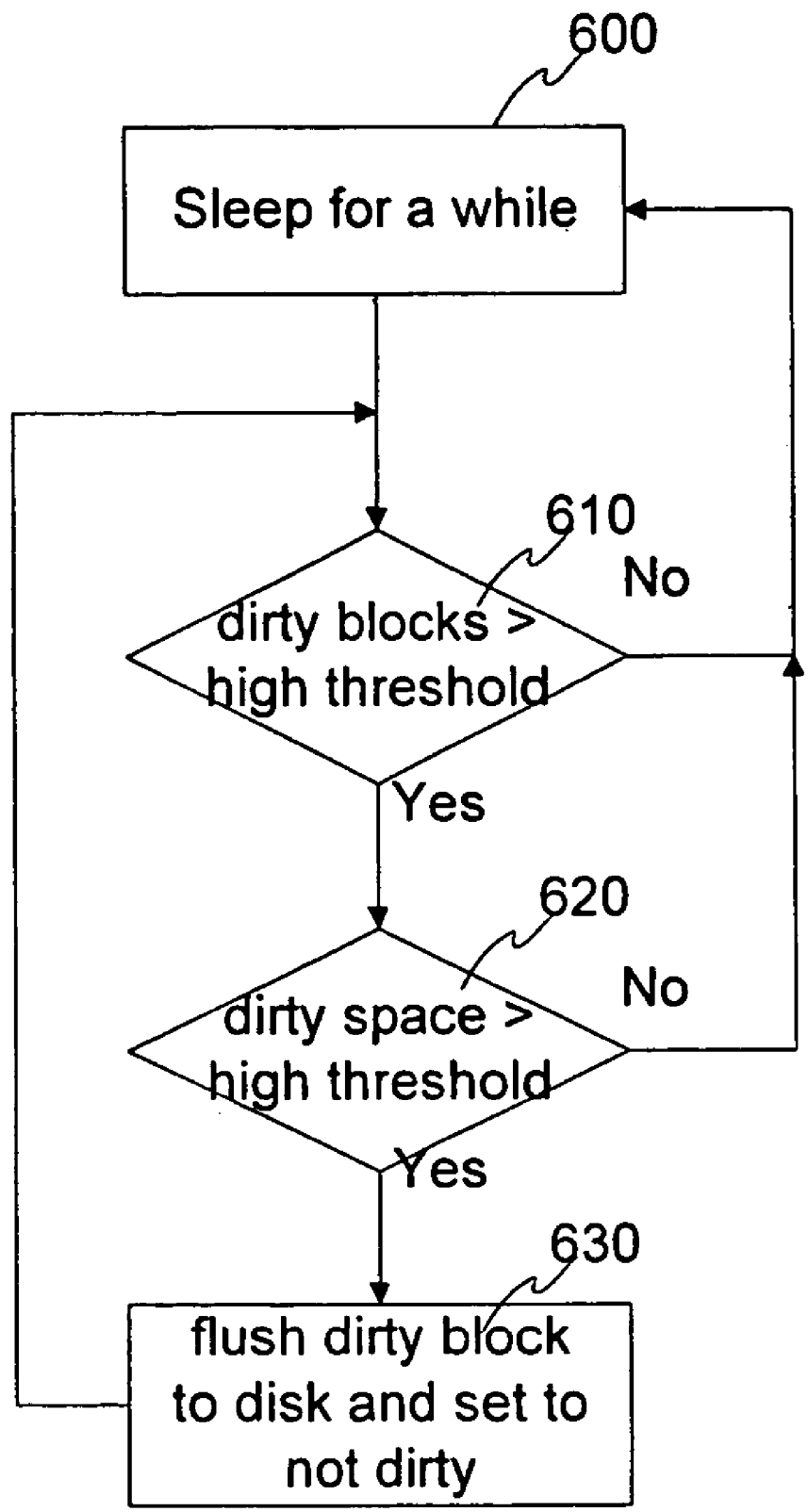
FIG. 7 shows a flow diagram of a process running on a host CPU that flushes dirty blocks to the disk according to the present invention.

FIG. 7 shows the working flow of the flush thread method. In general, the flush thread usually sleeps at step 600. It will awaken when a predetermined time has been expired or the number of dirty blocks is over a threshold (from step 450 of FIG. 5). The flush thread will check if the number of dirty blocks and the space of dirty blocks is over a threshold at step 610 and 620. The threshold values may be set to control the frequency of the flush thread operation. In general, the flush thread will also write all dirty blocks to the disks 210–240 when the system is shut down. At step 630, the dirty blocks on the RAID cache 205 will be written at step 630 and the blocks are set to "not dirty."

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A method of read/write operation in a RAID-5 configured storage system having a RAID controller, a RAID cache memory, a plurality of physical disks, and one or more logical disks, the method comprising:
   reading data from said logical disk;
   writing data to said logical disk, wherein the writing process comprises:
      (i) reading an old data block and an old parity block from said logical disk or said RAID cache;
      (ii) forming a new parity block and a new data block by computing an XOR with the new data and the old data block and the old parity block;
      (iii) updating the logical disk by placing the new data block and the new parity block in the RAID cache or the logical disk by:
         (a) finding a buffer of a physical disk number and a physical block number in the RAID cache memory by a search algorithm;
         (b) allocating in the RAID cache memory a buffer area in the case when the physical disk number and the physical block number cannot be found; and
         (c) writing data to the allocated buffer area and setting the allocated buffer area as a dirty buffer in the RAID cache memory;
   flushing data from said cache memory to said logical disk when the RAID controller is idle; and
   otherwise performing read/write operations under the control of the RAID controller to the RAID cache memory.

2. The method of claim 1 wherein the reading process comprises:
   determining whether an old data block to be read is already stored in the RAID cache memory, and if so, reading said old data block from said RAID cache memory; and
   if said old data block is not stored in the RAID cache memory, allocating a read buffer area from said RAID cache memory and transferring said old data block from said logical disk to said read buffer area and reading said old data block from the RAID cache memory.

3. The method of claim 2 wherein said read buffer area is a non-dirty and least used block within the RAID cache memory.

4. The method of claim 1 where flushing the cache memory comprises:
   selecting the dirty buffers in the RAID cache memory;
   writing the dirty buffers to the logical disk; and
   setting the dirty buffers as a clean buffer in the RAID cache memory.

5. The method of claim 1 wherein the allocating a buffer process comprises:
   flushing cache memory to the logical disk if no clean buffer is found in the RAID cache memory; and
   selecting a least used buffer in the RAID cache memory for allocation.

* * * * *

UNITED STATES PATENT AND TRADEMARK OFFICE
CERTIFICATE OF CORRECTION

PATENT NO. : 7,051,156 B2  Page 1 of 1
APPLICATION NO. : 10/688359
DATED : May 23, 2006
INVENTOR(S) : Rung-Ji Shang It is certified that error appears in the above-identified patent and that said Letters Patent is hereby corrected as shown below:

Title Page

Item 56 please delete the following cited ref.

| | | |
|---|---|---|
| 4,744,980 | 5/1988 | Holly |
| 4,818,537 | 4/1989 | Guo |
| 4,914,088 | 04/1990 | Glonek et al. |
| 5,371,108 | 12/1994 | Korb et al. |
| 0448762 | 10/1991 | |
| 1020194 | 7/2000 | |
| WO83/00091 | 1/1983 | |

Signed and Sealed this

Thirteenth Day of May, 2008

JON W. DUDAS
*Director of the United States Patent and Trademark Office*